(12) United States Patent
Inoue

(10) Patent No.: US 8,964,226 B2
(45) Date of Patent: Feb. 24, 2015

(54) INFORMATION PROCESSING APPARATUS, METHOD FOR CONTROLLING THE SAME, AND PROGRAM

(71) Applicant: Canon Kabushiki Kaisha, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/910,877

(22) Filed: Jun. 5, 2013

(65) Prior Publication Data

US 2013/0329255 A1 Dec. 12, 2013

(30) Foreign Application Priority Data

Jun. 7, 2012 (JP) ................................ 2012-129889

(51) Int. Cl.
*G06F 3/12* (2006.01)
*G06K 15/00* (2006.01)
*G06F 21/60* (2013.01)
*G06F 21/74* (2013.01)
*G06F 21/85* (2013.01)
*G03G 15/00* (2006.01)

(52) U.S. Cl.
CPC .......... *G06K 15/4055* (2013.01); *G06K 15/406* (2013.01); *G06F 21/606* (2013.01); *G06F 21/74* (2013.01); *G06F 21/85* (2013.01); *G03G 15/5004* (2013.01); *G06F 3/1221* (2013.01); *G06F 3/1222* (2013.01); *G06F 3/1226* (2013.01); *G06F 3/1285* (2013.01); *G06F 2221/2101* (2013.01); *G06F 2221/2105* (2013.01); *G06F 2221/2151* (2013.01); *G06F 3/1236* (2013.01)
USPC .......................................... 358/1.15; 358/1.1

(58) Field of Classification Search
USPC .................................... 358/1.15, 1.1
See application file for complete search history.

(56) References Cited

U.S. PATENT DOCUMENTS

2006/0236143 A1* 10/2006 Kidoguchi .................... 713/320
2010/0245108 A1* 9/2010 Ando ....................... 340/815.45

FOREIGN PATENT DOCUMENTS

JP 2006-259906 A 9/2006

* cited by examiner

*Primary Examiner* — Martin Mushambo
(74) *Attorney, Agent, or Firm* — Canon USA, Inc., IP Division

(57) ABSTRACT

When an information processing apparatus is in the normal mode, the main controller determines whether or not the main controller is to perform a process on a received packet, on the basis of a filtering condition which is set in the information processing apparatus. When the information processing apparatus is in the sleep mode, a communication unit determines whether or not the communication unit, instead of the main controller, is to perform a process on a received packet, on the basis of the filtering condition.

6 Claims, 9 Drawing Sheets

FILTERING CONDITION: IP ADDRESS

- RECEIVE FILTER
  RECEPTION REFUSAL ADDRESS 1: 192.168.4.40
  RECEPTION REFUSAL ADDRESS 2: 192.168.4.1
  ADDRESSES OTHER THAN ABOVE-DESCRIBED
  ADDRESSES: PERMITTED

- TRANSMIT FILTER
  TRANSMISSION REFUSAL ADDRESS 1: 192.168.4.40
  TRANSMISSION REFUSAL ADDRESS 2: 192.168.4.1
  ADDRESSES OTHER THAN ABOVE-DESCRIBED
  ADDRESSES: PERMITTED

FILTERING CONDITION: IP ADDRESS

- RECEIVE FILTER
  RECEPTION PERMISSION ADDRESS 1: 192.168.7.24
  ADDRESSES OTHER THAN ABOVE-DESCRIBED
  ADDRESSES: REFUSED

- TRANSMIT FILTER
  ALL ARE PERMITTED

FILTERING CONDITION: SNMP v1

COMMUNITY NAME TO BE PERMITTED: Private

FILTERING CONDITION: SNMP v3

AUTHENTICATION: TO BE PERFORMED
  USER NAME: xxx
  PASSWORD: yyy

FIG. 8

| FILTERING HISTORY | | |
|---|---|---|
| DATE AND TIME 801 | FILTERING PROCESS 802 | IP ADDRESS 803 |
| 05/01 07:00 (SLEEP MODE) | RECEPTION REFUSAL | 192.168.4.40 |
| 05/01 10:10 (NORMAL MODE) | RECEPTION REFUSAL | 192.168.4.4 |
| 05/02 07:00 (SLEEP MODE) | RECEPTION REFUSAL | 192.168.4.40 |
| 05/02 15:30 (NORMAL MODE) | TRANSMISSION REFUSAL | 192.168.4.40 |

OK

INFORMATION PROCESSING APPARATUS, METHOD FOR CONTROLLING THE SAME, AND PROGRAM

BACKGROUND OF THE INVENTION

1. Field of the Invention

The present invention relates to an information processing apparatus, a method for controlling an information processing apparatus, and a program.

2. Description of the Related Art

There has been an increasing demand for a reduction of the power consumption in information processing apparatuses, such as printers and digital multi-function devices. A known method which satisfies this demand is as follows. When an information processing apparatus has not been operating for a predetermined time period, the power supply to a communication unit in the information processing apparatus is maintained, whereas the power supply to the main controller in the information processing apparatus is reduced or interrupted, achieving a reduction in the power supply to the entire information processing apparatus. Japanese Patent Laid-Open No. 2006-259906 describes the following method. When a communication unit receives a packet transmitted from the outside in a state in which the power supply to the main controller is reduced or interrupted, instead of waking the main controller, the communication unit, instead of the main controller, responds to the received packet.

Another known method used in an information processing apparatus, such as a printer or a digital multi-function device, is one in which filtering conditions, such as a transmission refusal condition and a reception refusal condition, are used to restrict communication between an external apparatus and the information processing apparatus, achieving improved security. For example, an information processing apparatus responds to a Ping request transmitted from an external apparatus, whereby the MAC address of the information processing apparatus may leak, or the response to the Ping request may cause information about the operating system (OS) of the information processing apparatus to leak to the outside. To address this problem, a filtering condition in which communication only from/to particular external apparatuses is permitted is set, prohibiting a response to an external apparatus other than the particular external apparatuses. Therefore, leakage of information about an information processing apparatus to outsiders as described above can be prevented.

Heretofore, a filtering process using a filtering condition has been performed by a main controller. When a communication unit responds to a packet as described in Japanese Patent Laid-Open No. 2006-259906, a filtering process is not performed. Therefore, the method described in Japanese Patent Laid-Open No. 2006-259906 has a problem in that security cannot be ensured because a communication unit responds to an outsider to whom a response is to be prohibited, with the result that information about the information processing apparatus leaks to the outsider.

SUMMARY OF THE INVENTION

The present invention has been made in view of the above-described problem, and provides an information processing apparatus which enables a communication unit to use a filtering condition even when the communication unit performs a process on a received packet.

To solve the above-described problem, the present invention provides an information processing apparatus including a controller and a communication unit. The controller includes a first determination unit and a first execution unit. The first determination unit performs a first determination as to whether or not the controller is to perform first packet processing on a received packet on the basis of a filtering condition which is set in advance, when the information processing apparatus is in a first power mode. The first execution unit performs the first packet processing on the received packet when the first determination unit determines that the controller is to perform the first packet processing on the received packet. The communication unit includes a second determination unit and a second execution unit. The second determination unit performs a second determination as to whether or not the communication unit is to perform second packet processing on a received packet on the basis of the filtering condition when the information processing apparatus is in a second power mode in which a power consumption is smaller than a power consumption in the first power mode. The second execution unit performs the second packet processing on the received packet when the second determination unit determines that the communication unit is to perform the second packet processing on the received packet.

Further features of the present invention will become apparent from the following description of exemplary embodiments with reference to the attached drawings.

BRIEF DESCRIPTION OF THE DRAWINGS

FIGS. 3A to 3C are diagrams each illustrating an exemplary filtering condition.

FIG. 8 is a diagram illustrating a screen for checking a history of filtering processes.

DESCRIPTION OF THE EMBODIMENTS

Embodiments for carrying out the present invention will be described below with reference to the drawings. The embodiments described below are not limited to the invention according to the scope of the claims. In addition, all combinations described in the embodiments are not always necessary to solutions used in the invention.

First Embodiment

Figure 1:
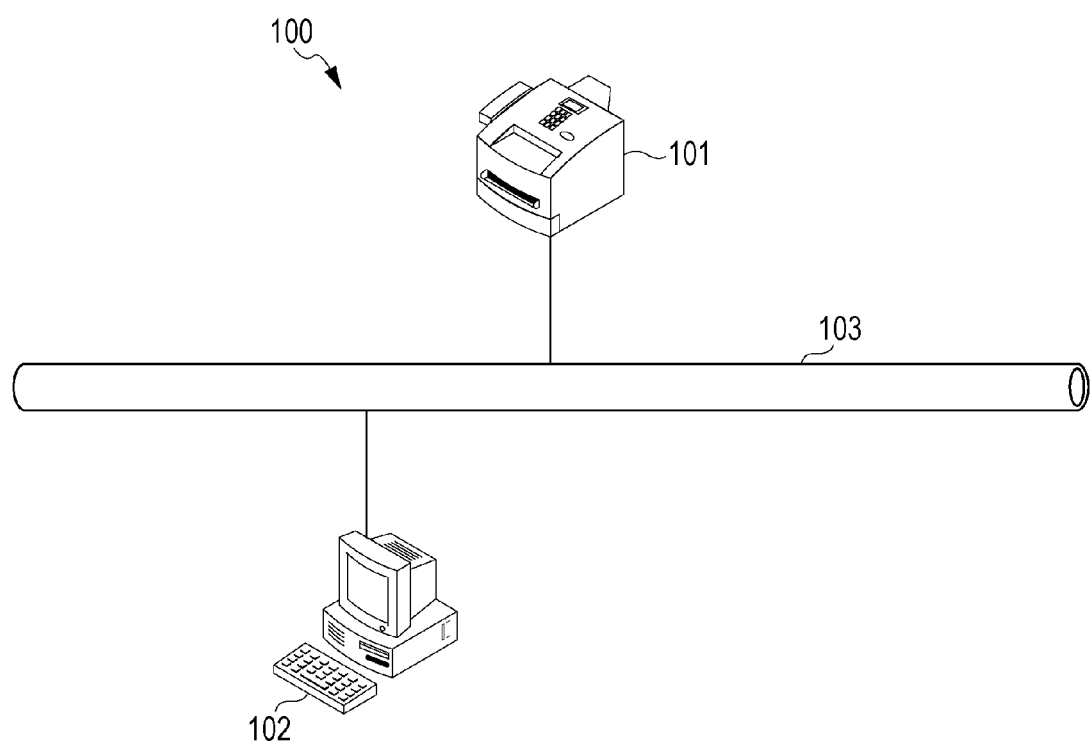
FIG. 1 is a diagram illustrating an information processing system.

The configuration of an information processing system 100 according to a first embodiment will be described by using FIG. 1. The information processing system 100 includes an information processing apparatus 101 and a personal computer (PC) 102. The information processing apparatus 101 and the PC 102 are connected to each other via a network 103.

Figure 2:
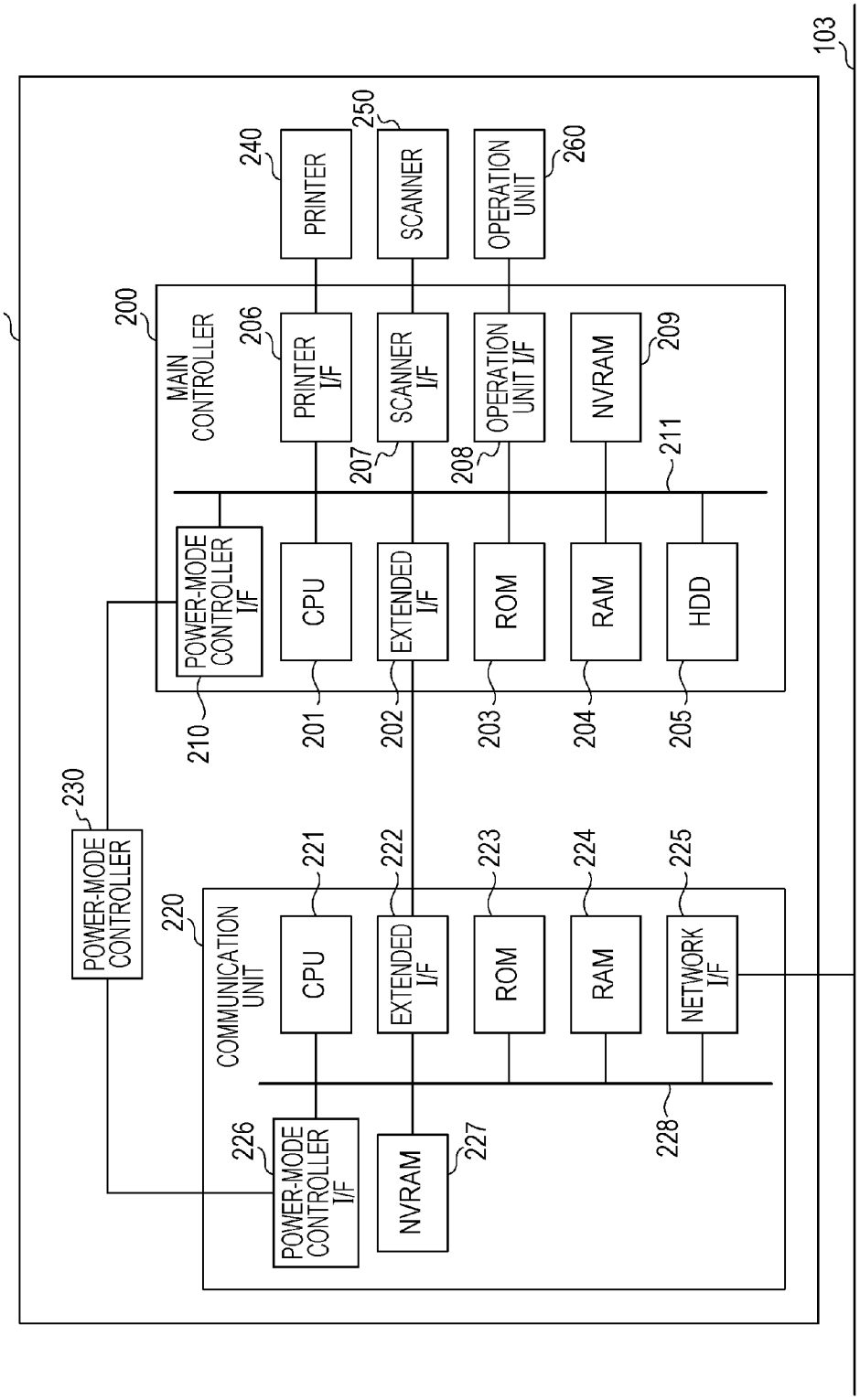
FIG. 2 is a diagram illustrating the configuration of an information processing apparatus.

The hardware configuration of the information processing apparatus 101 will be described by using FIG. 2. The information processing apparatus 101 is a digital multi-function device (printing device) provided with a copy function, a print function, a scanning function, a transmitting function, and the like. In the first embodiment, description will be made taking a digital multi-function device as an example. However, the information processing apparatus 101 is not limited to a digital multi-function device. It is not necessary for the information processing apparatus 101 to be provided with all of the functions describe above. The information processing apparatus 101 may be provided with at least one of the functions described above, or may be further provided with other functions.

The information processing apparatus 101 includes a main controller 200, a communication unit 220, a power-mode controller 230, a printer 240, a scanner 250, and an operation unit 260. The configurations of these units will be described.

The main controller 200 includes a central processing unit (CPU) 201, an extended interface (I/F) 202, a read-only memory (ROM) 203, a random-access memory (RAM) 204, a hard disk drive (HDD) 205, a printer I/F 206, a scanner I/F 207, an operation unit I/F 208, a nonvolatile random-access memory (NVRAM) 209, and a power-mode controller I/F 210. These units are connected to each other via a bus 211 so as to communicate with each other.

The CPU 201 reads out control programs stored in the ROM 203, and controls the operations of the entire information processing apparatus 101. The RAM 204 is used as a temporary storage area, such as the main memory or a work area for the CPU 201. The HDD 205 is used as a storage area for storing font data, emulation programs, form data, and a history of filtering which is described below. The NVRAM 209 is a nonvolatile memory, and stores various types of information. The extended I/F 202 communicates with the communication unit 220.

The printer I/F 206 connects the main controller 200 and the printer 240. The printer 240 performs printing on the basis of a print job and image data generated by the scanner 250. The image data to be printed in the printer 240 is transferred from the main controller 200 to the printer 240 via the printer I/F 206.

The scanner I/F 207 connects the main controller 200 and the scanner 250. The scanner 250 reads out a document and generates image data. The image data generated by the scanner 250 is transferred to the main controller 200 via the scanner I/F 207.

The operation unit I/F 208 connects the main controller 200 and the operation unit 260. The operation unit 260 is provided with, for example, a liquid-crystal display having a touch panel function, and a keyboard. Information which is input by a user using the operation unit 260 is transferred to the main controller 200 via the operation unit I/F 208.

The power-mode controller I/F 210 connects the main controller 200 and the power-mode controller 230. An instruction to switch the power mode which is described below is transferred from the main controller 200 to the power-mode controller 230 via the power-mode controller I/F 210.

The communication unit 220 will be described. The communication unit 220 includes a CPU 221, an extended I/F 222, a ROM 223, a RAM 224, a network I/F 225, a power-mode controller I/F 226, and an NVRAM 227. These units are connected to each other via a bus 228 so as to communicate with each other.

The CPU 221 reads out control programs stored in the ROM 223, and controls the operations of the communication unit 220. The RAM 224 is used as a temporary storage area, such as the main memory and a work area for the CPU 221. The NVRAM 227 is a nonvolatile memory, and stores various types of information.

The network I/F 225 is connected to the network 103, and receives/transmits data from/to an external apparatus such as the PC 102. The extended I/F 222 communicates with the main controller 200.

The power-mode controller I/F 226 connects the communication unit 220 and the power-mode controller 230. An instruction to switch the power mode which is described below is transferred from the communication unit 220 to the power-mode controller 230 via the power-mode controller I/F 226.

Figure 9:
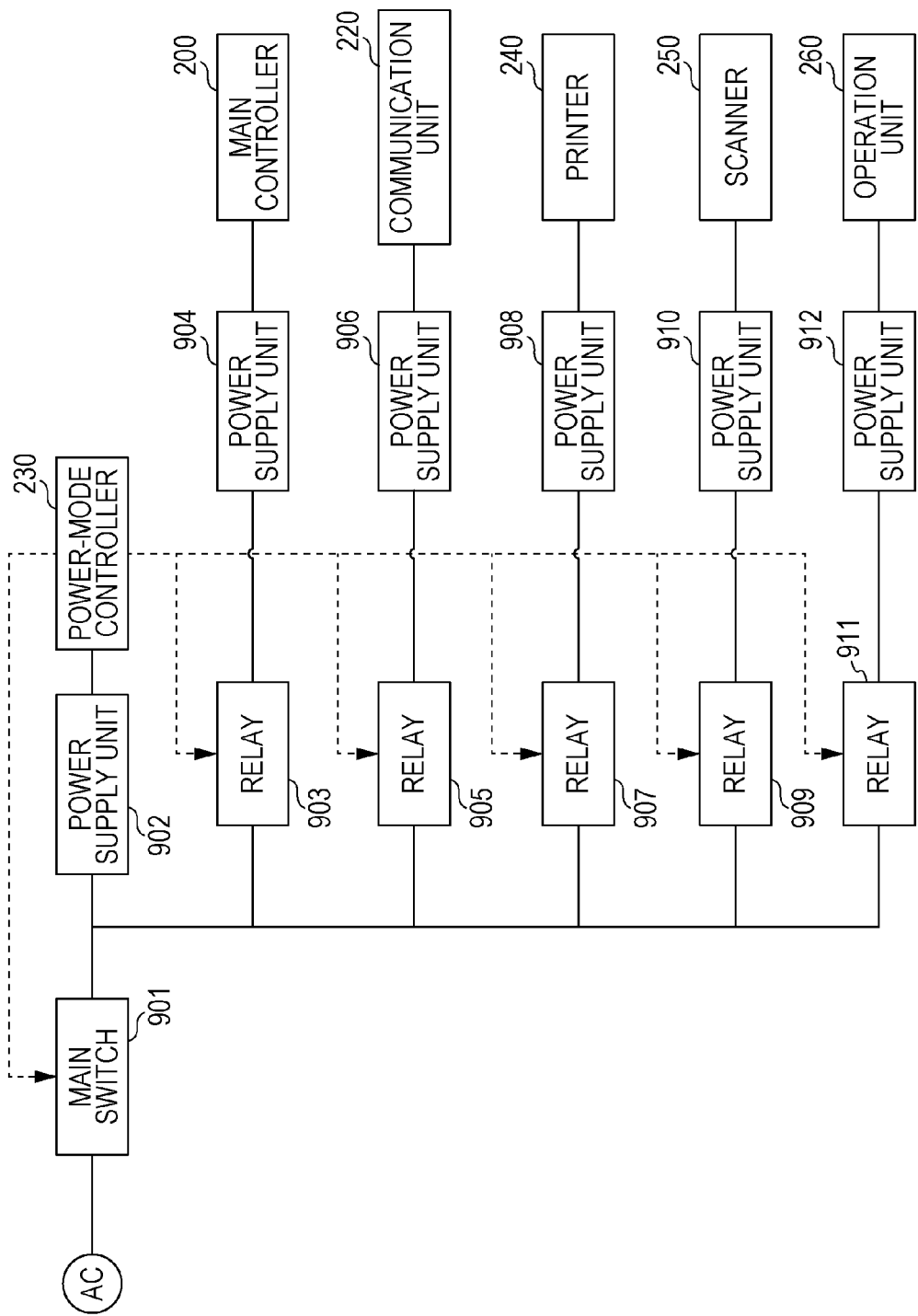
FIG. 9 is a diagram illustrating the configuration of the power supply circuit in the information processing apparatus.

The power mode of the information processing apparatus 101 and the operations of the power-mode controller 230 will be described by using FIG. 9. FIG. 9 is a diagram illustrating the configuration of the power supply circuit of the information processing apparatus 101.

The information processing apparatus 101 is connected to an alternating-current power supply AC to which a main switch 901 and a power supply unit 902 are connected. The main switch 901 turns on/off the power supplied from the alternating-current power supply AC to the units in the information processing apparatus 101. The power supply unit 902 converts the alternating-current (AC) power supply supplied from the alternating-current power supply AC into a direct-current (DC) power supply, and supplies the DC power supply to the power-mode controller 230.

A relay 903 and a power supply unit 904 are disposed between the main switch 901 and the main controller 200. The power supply unit 904 converts the AC power supply supplied from the alternating-current power supply AC into a DC power supply, and supplies the DC power supply to the main controller 200.

A relay 905 and a power supply unit 906 are disposed between the main switch 901 and the communication unit 220. The power supply unit 906 converts the AC power supply supplied from the alternating-current power supply AC into a DC power supply, and supplies the DC power supply to the communication unit 220.

A relay 907 and a power supply unit 908 are disposed between the main switch 901 and the printer 240. The power supply unit 908 converts the AC power supply supplied from the alternating-current power supply AC into a DC power supply, and supplies the DC power supply to the printer 240.

A relay 909 and a power supply unit 910 are disposed between the main switch 901 and the scanner 250. The power supply unit 910 converts the AC power supply supplied from the alternating-current power supply AC into a DC power supply, and supplies the DC power supply to the scanner 250.

A relay 911 and a power supply unit 912 are disposed between the main switch 901 and the operation unit 260. The power supply unit 912 converts the AC power supply supplied from the alternating-current power supply AC into a DC power supply, and supplies the DC power supply to the operation unit 260.

The main switch 901 and the relays 903, 905, 907, 909, and 911 which are described above are controlled by the power-mode controller 230 to turn on/off.

The power mode of the information processing apparatus 101 will be described. In the first embodiment, the information processing apparatus 101 has two modes, i.e., the normal mode (first power mode) and the sleep mode (second power mode).

In the normal mode, the power-mode controller 230 causes each of the relays 903, 905, 907, 909, and 911 to turn on. That is, the normal mode is a mode in which power is supplied to the power-mode controller 230, the main controller 200, the communication unit 220, the printer 240, the scanner 250, and the operation unit 260.

In the sleep mode, the power-mode controller 230 causes the relay 905 to turn on, whereas the power-mode controller 230 causes each of the relays 903, 907, 909, and 911 to turn off. That is, the sleep mode is a mode in which power is supplied to the power-mode controller 230 and the communication unit 220, and in which power is not supplied to the main controller 200, the printer 240, the scanner 250, and the operation unit 260.

When the normal mode is compared with the sleep mode, since power is not supplied to some of the units in the information processing apparatus 101 (such as the main controller 200 and the printer 240) in the sleep mode, the power consumption in the sleep mode is smaller than that in the normal mode. Thus, the sleep mode is a power-saving mode. In the first embodiment, the description is made in which the main controller 200 is not supplied with power in the sleep mode. Instead of stopping the power supply to the main controller 200, the power supplied to the main controller 200 may be reduced by using the power supply unit 904 in the sleep mode. Alternatively, the clock gating may be used to stop supply of the clock to the main controller 200 in the sleep mode.

In the case where the information processing apparatus 101 is in the sleep mode, when the communication unit 220 receives a packet transmitted from an external apparatus such as the PC 102, the communication unit 220 analyzes the received packet and determines how to respond to the received packet. Specifically, the communication unit 220 determines which process among the following processes is to be performed: a process in which the main controller 200 is waked, i.e., the power mode is switched from the sleep mode to the normal mode and the main controller 200 responds to the received packet; a process in which the communication unit 220 responds to the received packet while the power mode remains to be the sleep mode (hereinafter, referred to as proxy responding); and a process in which the received packet is discarded.

A filtering condition used in a filtering process will be described. A filtering condition 300 in FIG. 3A is an exemplary filtering condition used in a filtering process. A filtering condition, which describes two types of filter which are a receive filter and a transmit filter, is set by a user via the operation unit 260, and is stored in the NVRAM 209.

In the filtering condition 300, two addresses from which a packet reception is to be refused (hereinafter, referred to as a reception refusal address) are set as a receive filter, and other addresses are set as an address from which a packet reception is permitted. In the filtering condition 300, the example is described in which two reception refusal addresses are set. However, the number of reception refusal addresses which are set may be any. According to the filtering condition 300, a response to a packet transmitted from an external apparatus having an IP address which is set as a reception refusal address is prohibited. A received packet to which a response is prohibited is discarded. In the filtering condition 300, two addresses to which a packet transmission is to be refused (hereinafter, referred to as a transmission refusal address) are set as a transmit filter, and other addresses are set as an address to which a packet transmission is permitted. According to the filtering condition 300, transmission of a packet whose destination address is an IP address which is set as a transmission refusal address is prohibited.

A filtering process performed in the normal mode will be described by using flowcharts in FIGS. 4 and 5.

The flowchart in FIG. 4 will be described. The flowchart in FIG. 4 describes a flow performed when the information processing apparatus 101 receives a packet transmitted from an external apparatus. Steps in the flowchart in FIG. 4 are processed with the CPU 201 of the main controller 200 which loads programs stored in a memory such as the ROM 203 into the RAM 204 and executes the loaded programs.

When the communication unit 220 receives a packet transmitted from an external apparatus, the received packet is transferred to the main controller 200 via the extended I/F 222. In step S401, the CPU 201 analyzes the received packet, and determines whether or not the received packet is a packet which is permitted to be received on the basis of a filtering condition stored in the NVRAM 209. For example, in the case where this filtering condition is the filtering condition 300 in FIG. 3A, when the IP address of the source from which the received packet is transmitted matches an IP address which is set as a reception refusal address, the CPU 201 determines that the received packet is not a packet which is permitted to be received. When the IP address of the source from which the received packet is transmitted does not match each of the IP addresses which are set as a reception refusal address, the CPU 201 determines that the received packet is a packet which is permitted to be received.

In step S401, if the CPU 201 determines that the received packet is a packet which is permitted to be received, the process proceeds to step S402. In step S402, the CPU 201 performs a process according to the received packet. For example, when the received packet corresponds to a print job, the CPU 201 causes the printer 240 to perform printing.

In step S401, if the CPU 201 determines that the received packet is not a packet which is permitted to be received, the process proceeds to step S403. In step S403, the CPU 201 discards the received packet. In step S404, the CPU 201 updates the history of filtering stored in the HDD 205. The history of filtering is a history of filtering processes which indicates that packet receptions and packet transmissions to external apparatuses were refused on the basis of the filtering condition. The history of filtering will be described in detail below by using FIG. 8.

The flowchart in FIG. 5 will be described. The flowchart in FIG. 5 describes a flow performed when the information processing apparatus 101 is to transmit a packet to an external apparatus. Steps in the flowchart in FIG. 5 are processed with the CPU 201 of the main controller 200 which loads programs stored in a memory such as the ROM 203 into the RAM 204 and executes the loaded programs.

When the information processing apparatus 101 is to transmit a packet to an external apparatus, in step S501, the CPU 201 determines whether or not the transmission is permitted to be performed on the basis of a filtering condition stored in the NVRAM 209. For example, in the case where this filtering condition is the filtering condition 300 in FIG. 3A, when the IP address of the destination to which the packet is to be transmitted matches an IP address which is set as a transmission refusal address, the CPU 201 determines that the transmission is not permitted to be performed. When the IP address of the destination to which the packet is to be transmitted does not match each of the IP addresses which are set as a transmission refusal address, the CPU 201 determines that the transmission is permitted to be performed.

In step S501, if the CPU 201 determines that the transmission is permitted to be performed, the process proceeds to step S502. In step S502, the CPU 201 transmits the packet to the external apparatus via the communication unit 220.

In step S501, if the CPU 201 determines that the transmission is not permitted to be performed, the process proceeds to step S503. In step S503, the CPU 201 controls the main controller 200 so that the main controller 200 does not transmit the packet to the external apparatus. In step S504, the CPU 201 updates the history of filtering stored in the HDD 205.

As described above, a filtering condition describing a receive filter and a transmit filter is used, enabling information about the information processing apparatus 101 to be prevented from leaking to a malicious outsider, for example, due to a response packet which is transmitted by the information processing apparatus 101. A filtering condition is not limited to the filtering condition 300 illustrated in FIG. 3A. Other than that, as in a filtering condition 310 in FIG. 3B, a reception permission address instead of a reception refusal address may be set as a filtering condition. In addition, other than an IP address, a MAC address or a port number may be used, or some of these may be combined and this combination may be used in setting a filtering condition. Alternatively, as in a filtering condition 320 in FIG. 3C, a filtering condition using Simple Network Management Protocol (SNMP) may be configured so that packets with a community name "private" for SNMPv1 are permitted to be received/transmitted, or so that authentication in SNMPv3 is required. These filtering conditions are set by a user via the operation unit 260, and are stored in the NVRAM 209.

Figure 4:
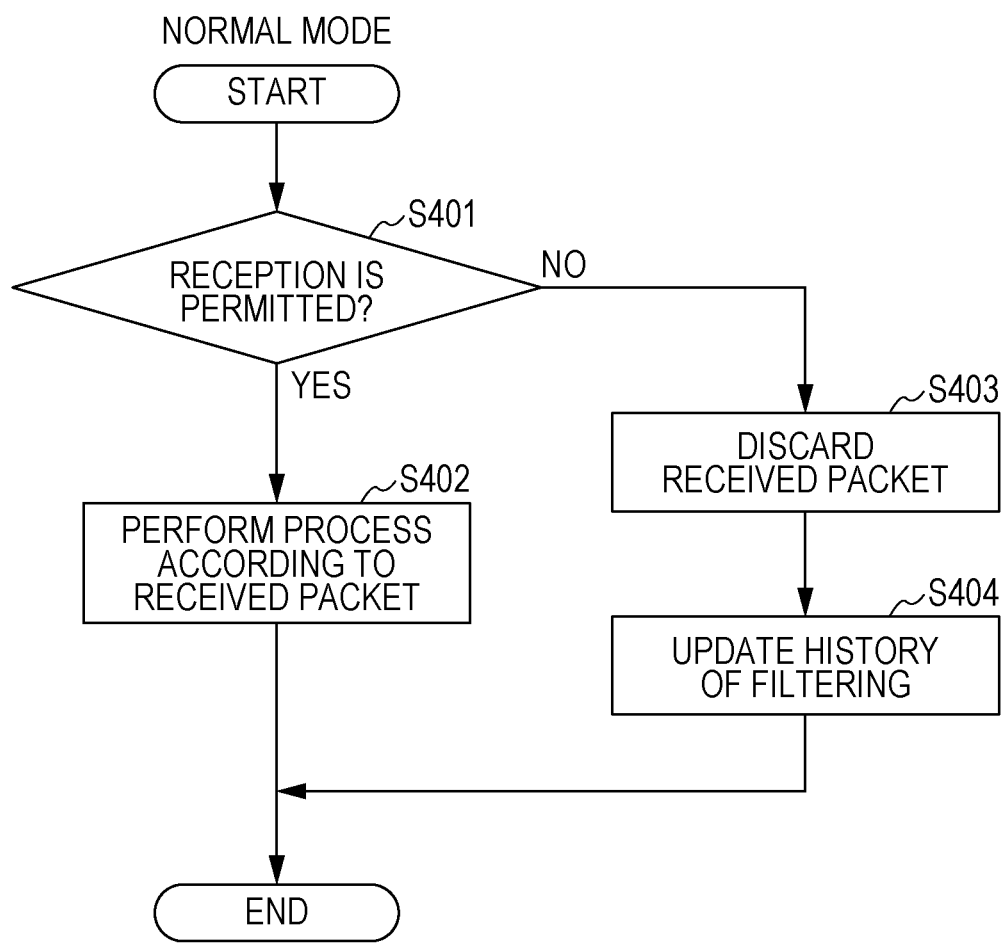
FIG. 4 is a flowchart of a filtering process performed by a main controller.
Figure 5:
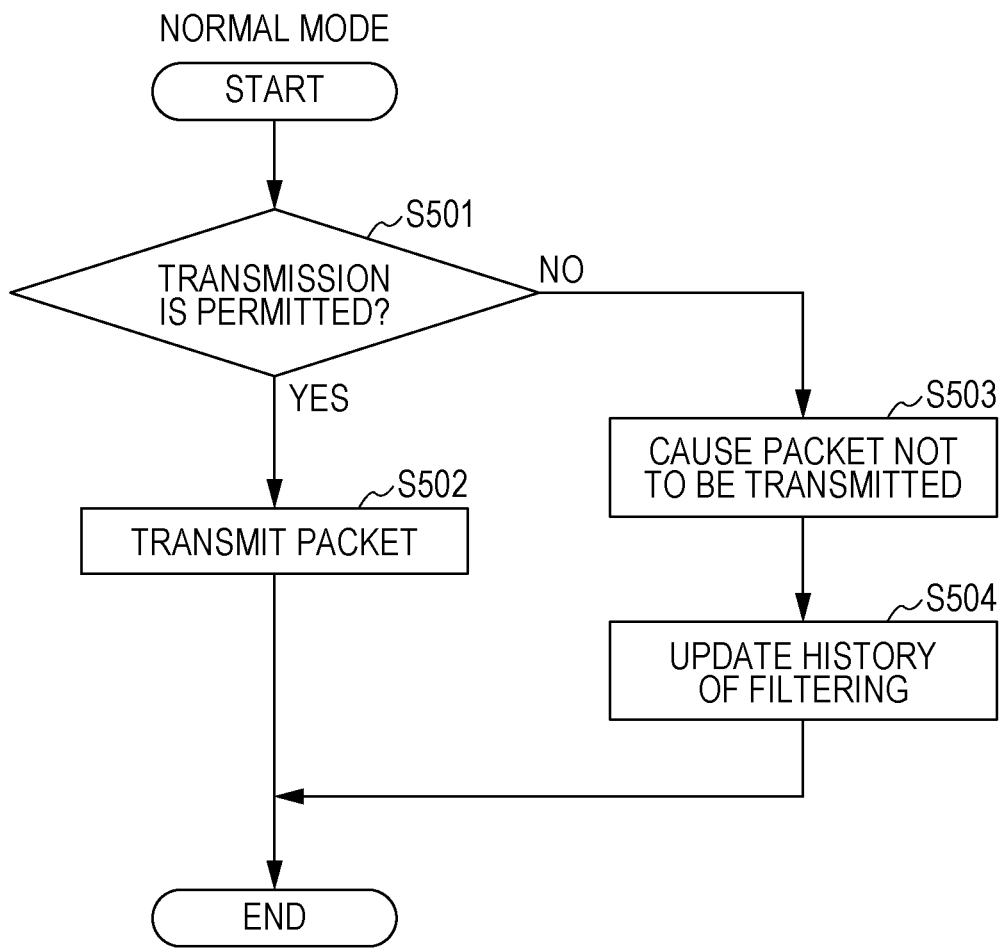
FIG. 5 is a flowchart of a filtering process performed by a main controller.

In FIGS. 4 and 5, the filtering processes are described which are performed by the main controller 200 when the information processing apparatus 101 is in the normal mode. When the information processing apparatus 101 is in the normal mode, the communication unit 220 does not perform a filtering process, and transfers a received packet to the main controller 200 by using the extended I/F 222. A filtering process performed by the communication unit 220 will be described in detail by using FIG. 7 described below.

Figure 6:
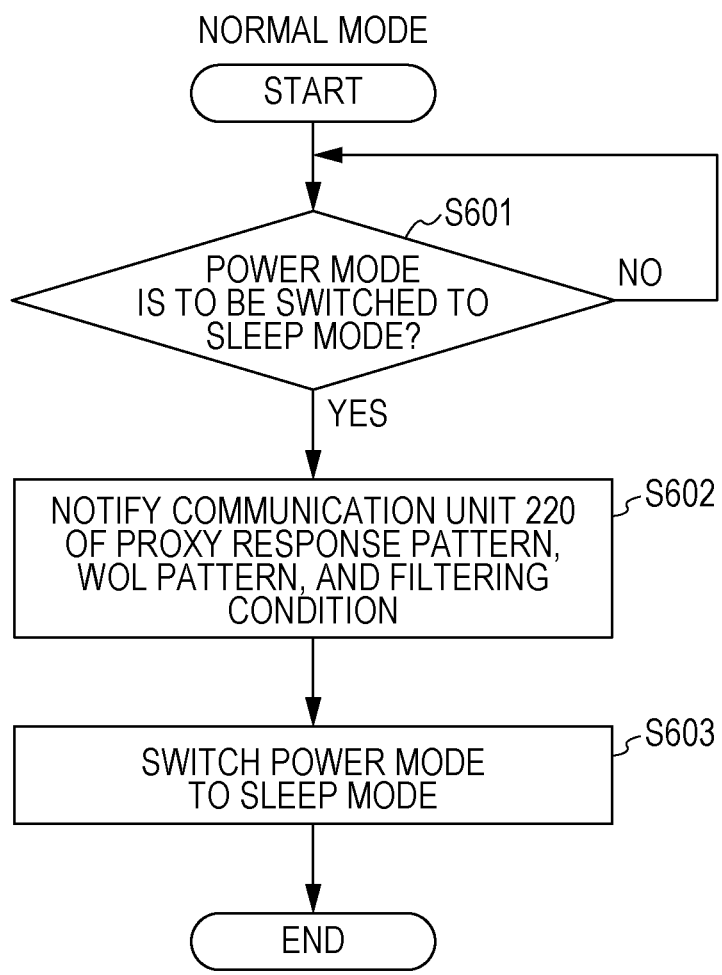
FIG. 6 is a flowchart illustrating how to switch from a normal mode to a power-saving mode.

A process performed when the information processing apparatus 101 is to be switched from the normal mode (first power mode) to the sleep mode (second power mode) will be described by using the flowchart in FIG. 6. Steps in the flowchart in FIG. 6 are processed with the CPU 201 of the main controller 200 which loads programs stored in a memory such as the ROM 203 into the RAM 204 and executes the loaded programs.

In step S601, the CPU 201 determines whether or not the power mode is to be switched to the sleep mode. In the first embodiment, when a user inputs an instruction to switch the power mode to the sleep mode through the operation unit 260 or a predetermined time period, e.g., ten minutes, has elapsed in the normal mode without a user operation, the CPU 201 determines that the power mode is to be switched from the normal mode to the sleep mode. In step S601, if the CPU 201 determines that the power mode is to be switched from the normal mode to the sleep mode, the process proceeds to step S602. In step S601, if the CPU 201 determines that the power mode is not to be switched from the normal mode to the sleep mode, the process waits until it is determined that the power mode is to be switched from the normal mode to the sleep mode in step S601.

In step S602, the main controller 200 notifies the communication unit 220 of a proxy response pattern, a wakeup on LAN (WOL) pattern, and a filtering condition via the extended I/F 202. The proxy response pattern, the WOL pattern, and the filtering condition which are transmitted in step S602 are stored in the NVRAM 227 of the communication unit 220.

The proxy response pattern is a pattern in which a proxy response from the communication unit 220 is allowed when the information processing apparatus 101 is in the sleep mode, and is stored in the NVRAM 209. As a proxy response pattern, a pattern indicating, for example, an address resolution protocol (ARP) request or an SNMP request to obtain device information to the information processing apparatus 101 is stored in the NVRAM 209. The WOL pattern is a pattern of packets which cause the main controller 200 to be waked, i.e., a pattern of packets which cannot be processed only by the communication unit 220, and is stored in the NVRAM 209. As a WOL pattern, for example, a pattern indicating a magic packet whose target is the information processing apparatus 101 or a print job is stored in the NVRAM 209.

The filtering condition is, for example, the filtering condition 300 in FIG. 3A. The same filtering condition as that used by the main controller 200 is transmitted to the communication unit 220 in step S602.

After the main controller 200 notifies the communication unit 220 of the proxy response pattern, the WOL pattern, and the filtering condition in step S602, the process proceeds to step S603. In step S603, the information processing apparatus 101 is switched from the normal mode to the sleep mode. In the first embodiment, the CPU 201 notifies the power-mode controller 230 of an instruction to switch the power mode to the sleep mode via the power mode I/F 210. The power-mode controller 230 causes the relays 903, 907, 909, and 911 to turn off, whereby the information processing apparatus 101 is switched from the normal mode to the sleep mode.

The filtering condition is transmitted to the communication unit 220 in step S602 because a filtering process similar to that which is performed by the main controller 200 in the normal mode and which is described using FIGS. 4 and 5 is also performed by the communication unit 220 in the sleep mode. The description is made in which notification of the proxy response pattern, the WOL pattern, and the filtering condition to the communication unit 220 is transmitted when the power mode is to be switched to the sleep mode (in step S602). Alternatively, this notification may be transmitted at a timing other than that described above. For example, when the information processing apparatus 101 is started or when the information processing apparatus 101 is connected to the network 103, the notification may be transmitted to the communication unit 220.

Figure 7:
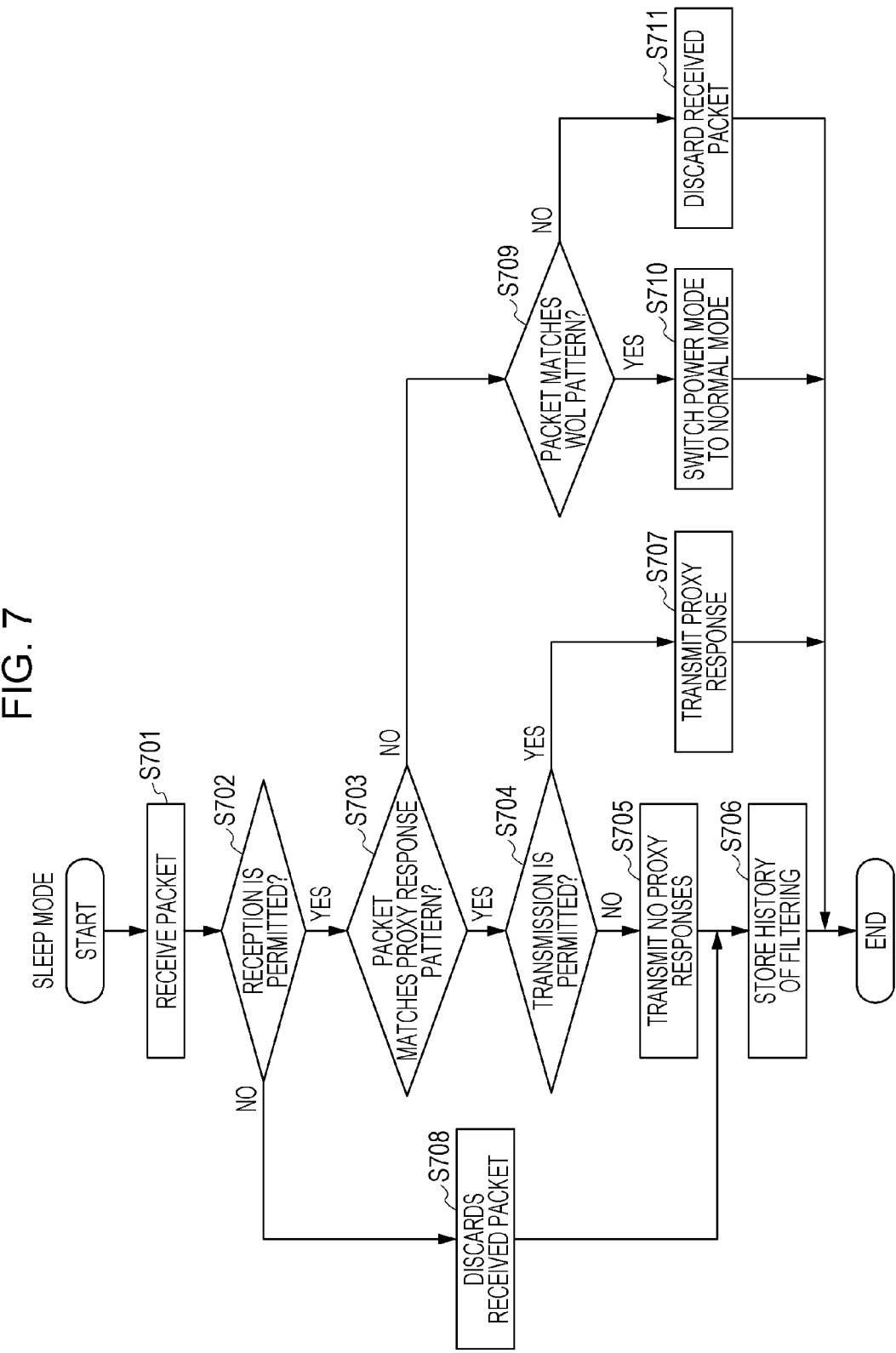
FIG. 7 is a flowchart of a filtering process performed by a communication unit.

A filtering process performed by the communication unit 220 when the information processing apparatus 101 is in the sleep mode will be described by using the flowchart in FIG. 7. Steps in the flowchart in FIG. 7 are processed with the CPU 221 of the communication unit 220 which loads programs stored in a memory such as the ROM 223 into the RAM 224 and executes the loaded programs. The NVRAM 227 of the communication unit 220 stores the proxy response pattern, the WOL pattern, and the filtering condition which are transmitted from the main controller 200 in step S602 in FIG. 6.

In step S701, the network I/F 225 receives a packet transmitted from an external apparatus. In step S702, the CPU 221 analyzes the packet received in step S701, and determines whether or not the received packet is a packet which is permitted to be received on the basis of the filtering condition. For example, in the case where this filtering condition is the filtering condition 300 in FIG. 3A, when the IP address of the source from which the received packet is transmitted matches an IP address which is set as a reception refusal address, the CPU 221 determines that the received packet is not a packet which is permitted to be received. When the IP address of the source from which the received packet is transmitted does not match each of the IP addresses which are set as a reception refusal address, the CPU 221 determines that the received packet is a packet which is permitted to be received.

If the CPU 221 determines that the received packet is not a packet which is permitted to be received in step S702, the process proceeds to step S708. In step S708, the CPU 221 discards the received packet. In step S706, the CPU 221 stores the history of filtering in the NVRAM 227. The reason the CPU 221 stores the history of filtering in step S706 is that the main controller 200 is notified of the results of filtering processes performed in the sleep mode when the power mode is switched to the normal mode.

If the CPU 221 determines that the received packet is a packet which is permitted to be received in step S702, the process proceeds to step S703. In step S703, the CPU 221 determines whether or not the received packet matches the proxy response pattern. If the CPU 221 determines that the received packet matches the proxy response pattern in step S703, the process proceeds to step S704. If the CPU 221 determines that the received packet does not match the proxy response pattern in step S703, the process proceeds to step S709.

Step S704 will be described. In step S704, the CPU 221 determines whether or not a proxy response is permitted to be transmitted in responding to the packet, on the basis of the filtering condition. For example, in the case where this filtering condition is the filtering condition 300 in FIG. 3A, when the IP address of the destination to which the response packet is to be transmitted matches an IP address which is set as a transmission refusal address, the CPU 221 determines that transmission of the response packet is not permitted. When the IP address of the destination to which the response packet is to be transmitted does not match each of the IP addresses which are set as a transmission refusal address, the CPU 221 determines that transmission of the response packet is permitted. Thus, the CPU 221 determines whether or not a proxy response is to be transmitted on the basis of the filtering condition in step S704.

If the CPU 221 determines that transmission of the response packet is not permitted in step S704, the process proceeds to step S705. In step S705, the CPU 221 controls the communication unit 220 so that the communication unit 220 does not transmit the proxy response. In step S706, the CPU 221 stores the history of the filtering in the NVRAM 227.

If the CPU 221 determines that transmission of the response packet is permitted in step S704, the process proceeds to step S707. In step S707, the CPU 221 transmits a proxy response.

Step S709 will be described. In step S709, the CPU 221 determines whether or not the received packet matches the WOL pattern. If the CPU 221 determines that the received packet matches the WOL pattern in step S709, the process proceeds to step S710. If the CPU 221 determines that the received packet does not match the WOL pattern in step S709, the process proceeds to step S711.

Step S710 will be described. In step S710, the information processing apparatus 101 is switched from the sleep mode to the normal mode. In the first embodiment, the CPU 221 notifies the power-mode controller 230 of an instruction to switch the power mode to the normal mode via the power mode I/F 226. The power-mode controller 230 causes the relays 903, 907, 909, and 911 to turn on, whereby the information processing apparatus 101 is switched from the sleep mode to the normal mode. The history of filtering describing the filtering processes which were performed by the communication unit 220 while the information processing apparatus 101 was in the sleep mode is transmitted from the communication unit 220 via the extended I/F 222 to the main controller 200 in step S710. The history of filtering transmitted in step S710 is the history of filtering stored in the NVRAM 227 of the communication unit 220 in step S706.

The history of filtering transmitted from the communication unit 220 is stored and updated in the HDD 205 by the CPU 201 of the main controller 200. Thus, the history of filtering describing the filtering processes performed in the sleep mode can be also stored in the main controller 200. When the power mode is switched to the normal mode in step S710, the filtering condition stored in the NVRAM 227 of the communication unit 220 is deleted.

Step S711 will be described. In step S711, the CPU 221 discards the received packet.

The history of filtering stored in the HDD 205 will be described. FIG. 8 is a diagram illustrating a screen for a user to check the history of filtering, and the screen is displayed on the operation unit 260 on the basis of the history of filtering stored in the HDD 205.

A column 801 indicates a date and time at which a filtering process was performed. In the column 801, display is performed in such a manner that a user can check in which mode, the normal mode or the sleep mode, the information processing apparatus 101 was when a filtering process was performed. Thus, according to the first embodiment, both of the following histories of filtering are displayed: the history of filtering describing filtering processes performed by the main controller 200 in the normal mode and the history of filtering describing filtering processes performed by the communication unit 220 in the sleep mode. Accordingly, a user can check the history of filtering describing filtering processes performed in both the normal mode and the sleep mode.

A column 802 indicates the type of a filtering process, i.e., "reception refusal" or "transmission refusal". A column 803 indicates the IP address of the source of a received packet when a filtering process is a "reception refusal" process, and indicates the IP address of the destination of a packet when a filtering process is a "transmission refusal" process.

As described above, according to the first embodiment, the communication unit 220 can also perform, in the sleep mode, a filtering process similar to that performed by the main controller 200 in the normal mode. Thus, for example, the communication unit 220 transmits a proxy response in the sleep mode, preventing a leakage of information about the information processing apparatus 101 to an external apparatus.

In addition, the filtering condition is transmitted from the main controller 200 to the communication unit 220 at a predetermined timing (e.g., in step S602 in FIG. 6). Therefore, it is not necessary for a user to set a filtering condition, not in an automatic manner, to both the main controller 200 and the communication unit 220, improving the usability.

Further, the history of filtering describing filtering processes performed in the sleep mode is transmitted from the communication unit 220 to the main controller 200. Therefore, a user can check the history of filtering describing filtering processes performed in both the normal mode and the sleep mode.

In the first embodiment, the example is described in which the proxy response pattern, the WOL pattern, and the filtering condition are stored in the NVRAM 209 of the main controller 200 and in the NVRAM 227 of the communication unit 220. However, the present invention is not limited to this. The proxy response pattern, the WOL pattern, and the filtering condition may be stored in a memory which can be referred to by both the CPU 201 and the CPU 221, and the memory may be referred to by the CPU 201 in the case of the normal mode and by the CPU 221 in the case of the sleep mode.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray Disc (BD)™), a flash memory device, a memory card, and the like.

The present invention enables a communication unit to use a filtering condition even when the communication unit performs a process on a received packet, enabling the security to be ensured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129889 filed Jun. 7, 2012, which is hereby incorporated by reference herein in its entirety.

What is claimed is:

1. An information processing apparatus comprising:
a first controller; and
a second controller,
wherein the first controller comprises:
a first determination unit configured to determine, in a case where the information processing apparatus operates in a first power mode in which power is supplied to both of the first controller and the second controller and the information processing apparatus receives a packet, whether the received packet is discarded, based on a filtering condition set in the information processing apparatus;
a first discarding unit configured to discard the received packet in a case where the first determination unit determines that the received packet is to be discarded; and
a first storing unit configured to store, in a case where the first discarding unit discards the received packet, first discarding history information for specifying the discarded packet,
wherein the second controller comprises:
a second determination unit configured to determine, in a case where the information processing apparatus operates in a second power mode in which power is not supplied to the first controller and power is supplied to the second controller and the information processing apparatus receives a packet, whether the received packet is discarded, based on a filtering condition set in the information processing apparatus;
a second discarding unit configured to discard the received packet in a case where the second determination unit determines that the received packet is to be discarded; and
a second storing unit configured to store, in a case where the second discarding unit discards the received packet, second discarding history information for specifying the discarded packet; and
wherein the first controller further comprises a displaying unit configured to display a discarding history screen for a user confirming both of the packet discarded in the case where the information processing apparatus operates in the first power mode and the packet discarded in the case where the information processing apparatus operates in the second power mode, based on the first discarding history information stored by the first storing unit and the second discarding history information stored by the second storing unit,
wherein, in a case where the information processing apparatus operates in the second power mode and the information processing apparatus receives a packet, the second determination unit determines whether the received packet is discarded, the second controller, instead of the first controller responds to the received packet, or the information processing apparatus is shifted from the second power mode to the first power mode, and
in a case where the second determination unit determines that the received packet is discarded, the second discarding unit discards the received packet, and
wherein the second controller further comprises:
a responding unit configured to respond to the received packet in a case where the second determination unit determines that the second controller, instead of the first controller responds to the received packet; and
a shifting unit configured to shift the information processing apparatus from the second power mode to the first power mode in a case where the second determination unit determines that the information processing apparatus is shifted from the second power mode to the first power mode.

2. The information processing apparatus according to claim 1,
wherein the second controller further comprises a notifying unit configured to notify the first controller of the second discarding history information stored by the second storing unit, and
wherein the displaying unit displays the discarding history screen based on the first discarding history information and the second discarding history information of which, from the second controller, the notifying unit has notified the first controller.

3. The information processing apparatus according to claim 2, wherein in a case where the information processing apparatus shifts from the second power mode to the first power mode, the notifying unit notifies the first controller of the second discarding history information stored by the second storing unit.

4. The information processing apparatus according to claim 1,
wherein the second controller further comprises
a notifying unit configured to notify the first controller of the second discarding history information stored by the second storing unit in the case where the shifting unit shifts the information processing apparatus from the second power mode to the first power mode, and
wherein the displaying unit displays the discarding history screen based on the first discarding history information and the second discarding history information of which, from the second controller, the notifying unit has notified the first controller.

5. A method for controlling an information processing apparatus including a first and second controller, the method comprising:
- a first determination step for determining, in a case where the information processing apparatus operates in a first power mode in which power is supplied to both of the first controller and the second controller and the information processing apparatus receives a packet, whether the received packet is discarded, based on a filtering condition set in the information processing apparatus;
- a first discarding step for discarding the received packet in a case where the first determination step determines that the received packet is to be discarded; and
- a first storing step for storing, in a case where the first discarding step discards the received packet, first discarding history information for specifying the discarded packet,
- a second determination step for determining, in a case where the information processing apparatus operates in a second power mode in which power is not supplied to the first controller and power is supplied to the second controller and the information processing apparatus receives a packet, whether the received packet is discarded, based on a filtering condition set in the information processing apparatus;
- a second discarding step for discarding the received packet in a case where the second determination step determines that the received packet is to be discarded; and
- a second storing step for storing, in a case where the second discarding step discards the received packet, second discarding history information for specifying the discarded packet; and
- displaying a discarding history screen for a user confirming both of the packet discarded in the case where the information processing apparatus operates in the first power mode and the packet discarded in the case where the information processing apparatus operates in the second power mode, based on the first discarding history information stored by the first storing step and the second discarding history information stored by the second storing step,
- wherein, in a case where the information processing apparatus operates in the second power mode and the information processing apparatus receives a packet, the second determination step determines whether the received packet is discarded, the second controller, instead of the first controller responds to the received packet, or the information processing apparatus is shifted from the second power mode to the first power mode, and
- in a case where the second determination step determines that the received packet is discarded, the second discarding unit discards the received packet, and
- a responding step for responding to the received packet in a case where the second determination step determines that the second controller, instead of the first controller responds to the received packet; and
- a shifting step for shifting the information processing apparatus from the second power mode to the first power mode in a case where the second determination step determines that the information processing apparatus is shifted from the second power mode to the first power mode.

6. A non-transitory computer-readable storage medium storing a control program, which when loaded into a computer and executed performs a method for controlling an information processing apparatus including a first and second controller, the method comprising:
- a first determination step for determining, in a case where the information processing apparatus operates in a first power mode in which power is supplied to both of the first controller and the second controller and the information processing apparatus receives a packet, whether the received packet is discarded, based on a filtering condition set in the information processing apparatus;
- a first discarding step for discarding the received packet in a case where the first determination step determines that the received packet is to be discarded; and
- a first storing step for storing, in a case where the first discarding step discards the received packet, first discarding history information for specifying the discarded packet,
- a second determination step for determining, in a case where the information processing apparatus operates in a second power mode in which power is not supplied to the first controller and power is supplied to the second controller and the information processing apparatus receives a packet, whether the received packet is discarded, based on a filtering condition set in the information processing apparatus;
- a second discarding step for discarding the received packet in a case where the second determination step determines that the received packet is to be discarded; and
- a second storing step for storing, in a case where the second discarding step discards the received packet, second discarding history information for specifying the discarded packet; and
- displaying a discarding history screen for a user confirming both of the packet discarded in the case where the information processing apparatus operates in the first power mode and the packet discarded in the case where the information processing apparatus operates in the second power mode, based on the first discarding history information stored by the first storing step and the second discarding history information stored by the second storing step,
- wherein, in a case where the information processing apparatus operates in the second power mode and the information processing apparatus receives a packet, the second determination step determines whether the received packet is discarded, the second controller, instead of the first controller responds to the received packet, or the information processing apparatus is shifted from the second power mode to the first power mode, and
- in a case where the second determination step determines that the received packet is discarded, the second discarding unit discards the received packet, and
- a responding step for responding to the received packet in a case where the second determination step determines that the second controller, instead of the first controller responds to the received packet; and
- a shifting step for shifting the information processing apparatus from the second power mode to the first power mode in a case where the second determination step determines that the information processing apparatus is shifted from the second power mode to the first power mode.

* * * * *